United States Patent [19]

Kitano et al.

[11] Patent Number: 4,696,697

[45] Date of Patent: Sep. 29, 1987

[54] POLISHING COMPOSITION

[75] Inventors: Hirohito Kitano; Toshiki Oowaki; Takashi Baba, all of Aichi; Japan

[73] Assignee: Fujimi Kenmazai Kogyo Kabushiki Kaisha, Japan

[21] Appl. No.: 827,195

[22] Filed: Feb. 7, 1986

[30] Foreign Application Priority Data

Jun. 4, 1985 [JP] Japan ................ 60-121200

[51] Int. Cl.$^4$ ................................ C09G 1/04
[52] U.S. Cl. .......................... 106/3; 15/214; 15/216; 51/307; 51/309; 427/355
[58] Field of Search ............ 106/3; 51/307, 309; 134/219; 427/355; 15/214, 216

[56] References Cited

U.S. PATENT DOCUMENTS 3,972,786  8/1976  Ballard .................. 204/32.1
4,225,349  9/1980  Kohiyama et al. ............ 106/3

FOREIGN PATENT DOCUMENTS 53-3518  2/1978  Japan .

Primary Examiner—Amelia B. Yarbrough
Attorney, Agent, or Firm—Lowe, Price, LeBlanc, Becker & Shur

[57] ABSTRACT

A composition for polishing a plastic product, a layer of non-electrolysis nickel plating, an alumite layer or an aluminum product comprises water, a polishing agent of aluminum oxide and a polishing accelerator of nickel sulfate, and is neutral or weak acid.

9 Claims, No Drawings

POLISHING COMPOSITION

BACKGROUND OF THE INVENTION

The present invention relates to polishing compositions, particularly compositions for polishing plastic products or non-electrolysis nickel plating layers.

A polishing composition for plastic products such as a plastic lens known in the art is a slurry formulated by suspending a polishing agent of aluminium oxide in water and adding a polishing accelerator of aluminium nitrate, as disclosed in JP-B-53-3518.

This slurry can polish plastic products at high efficiency and high quality. However, this is a slurry of strong acid and has pH value of about 4–2. On account of the strong acid, a polishing machine or a tool using this polish may rust and the hands of an operator may be roughened. Accordingly, the slurry is apt to harm machines or operators.

In recent years, a memory hard disc for computers or word processors has been made in process where a layer of non-electrolysis nickel plating, also called chemical plating, or a layer of alumite is formed on a substrate of aluminium so that a pre-treatment is performed, the pre-treatment surface is polished, and a layer of storage magnetic medium is formed on the smoothed pre-treatment surface. A general-purpose polishing slurry formulated by suspending a polishing agent of aluminium oxide in water is used as a composition for polishing the pre-treatment surface.

However, the general-purpose polishing slurry is low in efficiency for polishing a layer of non-electrolysis nickel plating or the like and therefore is not practicable. Consequently, a polishing composition for a layer of non-electrolysis nickel plating or the like has been desired.

SUMMARY OF THE INVENTION

In view of above-mentioned state of the prior art, an object of the invention is to provide a polishing composition which is capable of polishing a plastic product, a layer of non-electrolysis nickel plating or the like at high efficiency and high quality, and is not apt to harm machines or operators.

The inventors have discovered that when nickel sulfate is added to a slurry formulated by suspending a polishing agent of aluminium oxide in water, the slurry is neutral or weak acid and can polish a plastic product, a layer of non-electrolysis nickel plating or the like at high efficiency and with high quality of the polished surface.

The invention is based on the above-mentioned discovery. That is, the invention consists in a polishing composition which comprises water, a polishing agent of aluminium oxide and a polishing accelerator of nickel sulfate, and is neutral or weak acid.

A polishing composition of the invention, as clearly seen from a description of the results of comparative tests which will hereinafter appear, can polish a plastic product at high efficiency and high quality in similar manner to the prior art. Moreover, being different from the prior art, since the polishing composition is neutral or weak acid, a polishing machine or a tool is not liable to rust and the hands of an operator may not be roughened. Accordingly, the polishing composition is favorable for machines and operators.

Also the polishing composition of the invention, as clearly seen from a description of the results of comparative tests which will hereinafter appear, can polish a layer of non-electrolysis nickel plating or the like at higher efficiency and higher quality than in the prior art.

DETAILED DESCRIPTION OF THE PREFERRED EMBODIMENT

A polishing composition embodying the invention is composed of a slurry formulated by suspending a polishing agent of $\alpha$-aluminium oxide ($\alpha$-$Al_2O_3$) in pure water or deionized water and adding a polishing accelerator of nickel sulfate ($NiSO_4 \cdot 6H_2O$) thereto, and is neutral or weak acid.

The polishing accelerator is contained in the slurry at 1–20% by weight, and the slurry has a pH value of 7–5.

The polishing agent is contained at 2–30% by weight, and has mean a particle size of 0.7–4.0 $\mu$m and maximum particle size of 20 $\mu$m or less.

The polishing agent of $\alpha$-aluminium oxide is prepared by calcining granular boehmite ($Al_2O_3 \cdot H_2O$, $AlO(OH)$) at a temperature of 1,100°–1,200° C. for 2 to 3 hours, crushing relatively large particles into finer particles and separating particles falling within a predetermined particle size distribution.

In order to polish a plastic product, a layer of non-electrolysis nickel plating or the like using a polishing composition of the embodiment, the polishing composition is inserted into a clearance between a surface of the plastic product or the layer of non-electrolysis nickel plating or the like, and a surface of a polishing pad which is slidable on the surface of the product or the layer in a manner similar to the prior art.

Description will now be made of a series of comparative tests conducted to ascertain the advantages of the invention.

(1) Tests for polishing plastic products

A group of polishing compositions embodying the invention were prepared in the form of slurries each formulated by suspending a polishing agent of $\alpha$-aluminium oxide ($\alpha$-$Al_2O_3$) in deionized water and adding thereto a polishing accelerator of nickel sulfate ($NiSO_4 \cdot 6H_2O$) at 1.0, 5.0, 10.0 or 20.0% by weight. The slurries have the pH value shown in Table 1.

Polishing compositions of the prior art were prepared in the form of slurries each formulated by suspending a polishing agent of $\alpha$-aluminium oxide ($\alpha$-$Al_2O_3$) in deionized water and adding thereto a polishing accelerator of aluminium nitrate $[Al(NO_3)_3] \cdot 9H_2O$ at 1.0, 5.0, 10.0 or 20.0% by weight. The slurries have a pH value as shown in Table 1.

In the polishing slurries of the invention and the prior art, the polishing agent is contained at 20.0% by weight, and has a mean particle size of 1.3 $\mu$m and maximum particle size of 20 $\mu$m or less.

The polishing agent of $\alpha$-Aluminium oxide was prepared by calcining granular boehmite ($Al_2O_3 \cdot H_2O$, $AlO(OH)$) at a temperature of 1,150° C. for 3 hours, crushing relatively large particles into finer particles and separating particles falling within a predetermined particle size distribution.

A lens for glasses made of allyldiglycol carbonate resin having diameter of 65 mm is used as plastic product.

The lens was installed to an aspheric surface lens polisher, and a velveteen polishing pad or napped polishing pad abutted on the lens surface. The lens and the polishing pad were slide in a relative manner, and the lens was polished for 10 minutes. During polishing, the slurry of the invention or the prior art was supplied between the lens and the polishing pad at rate of 2 l/min. The polishing pressure was 270 g/cm².

After polishing, the polished lens surface was examined for the presence of such defects as orange peels and scratches. Then, the lens was weighed and weight loss due to the polishing was calculated so as to obtain the removal rate.

The test results are shown in Table 1 below.

TABLE 1 pH Value of Polishing Slurries and Polishing Results

| Polishing Accelerator by weight % | Invention | | | Prior Art | | |
|---|---|---|---|---|---|---|
| | pH Value (25° C.) | Removal Rate (mg/10 min.) | Surface Defect | pH Value (25° C.) | Removal Rate (mg/10 min.) | Surface Defect |
| 1.0 | 6.6 | 90 | none | 4.0 | 95 | none |
| 5.0 | 6.0 | 105 | none | 3.4 | 105 | none |
| 10.0 | 5.9 | 110 | none | 3.2 | 115 | none |
| 20.0 | 5.6 | 110 | none | 2.5 | 101 | none |

As seen from Table 1 above, the polishing slurry of the invention has a pH value of 6.6–5.6, and is neutral or weak acid. On the contrary, the polishing slurry of the prior art has a pH value of 4.0–2.5, and is strong acid. When the polishing slurry of the invention is used, similarly to the prior art, the removal rate is large and the polishing efficiency is high, and no surface defect is found and therefore the polished surface has high quality.

(2) Tests for polishing layers of non-electrolysis nickel plating or the like for a memory hard disc a. Non-electrolysis nickel.phosphorus plating In a polishing composition of the invention, the same slurry as in the case of the polishing tests of the plastic products is used.

In a polishing composition of the prior art, a slurry of the polishing composition of the invention without addition of the polishing accelerator is used.

A memory hard disc is constituted by forming layers of non-electrolysis nickel.phosphorus (Ni-P) plating, each having thickness of 30 μm on both surfaces of a circular ring-shaped substrate of aluminium having an outer diameter of 130 mm. The plating layer is formed in chemical composition of nickel 90–92% and phosphorus 8–10%.

The disc was installed to a double sided polishing machine, and suede polishing pads abutted on the plating layers of both surfaces of the disc. The disc and each polishing pad were slid in a relative manner, and the disc was polished for 10 minutes. During polishing, the slurry of the invention or the prior art was supplied between the lens and both polishing pads at rate of 0.1 l/min. The polishing pressure was 50 g/cm².

After polishing, the polished surfaces of the plating layers on both surfaces of the disc were examined for the presence of surface defects. Then, thickness of the disc was measured and the thickness decrease at both surfaces due to the polishing was calculated so as to obtain the removal rate.

The test results are shown in Table 2 below.

TABLE 2

Polishing Accelerators and Polishing Results

| | Polishing Accelerator by weight % | pH Value (25° C.) | Removal Rate μm/10 min. | Surface Defect |
|---|---|---|---|---|
| Prior Art | 0 | 7.0 | 3.1 | orange peels |
| Invention | 1.0 | 6.6 | 5.9 | none |
| | 5.0 | 6.0 | 6.3 | " |
| | 10.0 | 5.9 | 7.0 | " |
| | 20.0 | 5.6 | 6.1 | " |

As seen from Table 2 above, the polishing slurry of the invention provides a higher removal rate, i.e., a better polishing efficiency than that of the prior art, and no surface defect is found and therefore the polished surface has high quality.

b. Non-electrolysis nickel.boron plating

A memory hard disc is constituted by forming layers of non-electrolysis nickel boron (Ni-B) plating, each having a thickness of 30 μm on both surfaces of a circular ring-shaped substrate of aluminium having a outer diameter of 130 mm. The plating layer is formed in chemical compositions of nickel 99.0–99.5% and boron 0.5–1.0%.

The disc was polished in a manner similar to the polishing tests of layers of non-electrolysis nickel.phosphorus plating.

The test results are shown in Table 3 below.

TABLE 3

Polishing Accelerators and Polishing Results

| | Polishing Accelerator by weight % | pH Value (25° C.) | Removal Rate μm/10 min. | Surface Defect |
|---|---|---|---|---|
| Prior Art | 0 | 7.0 | 2.1 | orange peels |
| Invention | 10.0 | 5.9 | 5.5 | none |

As seen from Table 3 above, the polishing slurry of the invention provides a higher removal rate, i.e., a better polishing efficiency than that of the prior art, and no surface defect is found and therefore the polished surface has high quality.

c. Alumite

A memory hard disc is constituted by forming layers of alumite in place of layers of non-electrolysis nickel plating.

The disc was polished in similar manner to the polishing tests of layers of non-electrolysis nickel plating. The test results are shown in Table 4 below.

TABLE 4

Polishing Accelerators and Polishing Results

| | Polishing Accelerator by weight % | pH Value (25° C.) | Removal Rate μm/10 min. | Surface Defect |
|---|---|---|---|---|
| Prior Art | 0 | 7.0 | 1.0 | orange peels |

TABLE 4-continued

| Polishing Accelerators and Polishing Results | | | |
|---|---|---|---|
| Polishing Accelerator by weight % | pH Value (25° C.) | Removal Rate μm/10 min. | Surface Defect |
| Invention 10.0 | 5.9 | 8.0 | none |

As seen from Table 4 above, the polishing slurry of the invention provides a better polishing efficiency and higher polishing quality than that of the prior art.

d. Aluminium

A memory hard disc is a substrate of aluminium itself without forming a layer of non-electrolysis nickel plating or an alumite layer.

The disc was polished in similar manner to above-mentioned cases, and the test results are shown in Table 5 below.

TABLE 5

| Polishing Accelerators and Polishing Results | | | |
|---|---|---|---|
| Polishing Accelerator by weight % | pH Value (25° C.) | Removal Rate μm/10 min. | Surface Defect |
| Prior Art 0 | 7.0 | 1.5 | orange peels |
| Invention 10.0 | 5.9 | 8.5 | none |

As seen from Table 5 above, the polishing slurry of the invention is excellent in comparison to that of the prior art.

What we claim is:

1. A polishing composition comprising water, a polishing agent of aluminum oxide and a polishing accelerator of nickel sulfate, said polishing composition being neutral or weak acid in pH measurement.

2. A polishing composition as set forth in claim 1, wherein the polishing accelerator is contained in an amount of 1-20% by weight of the total composition, and the polishing composition has a pH value of 7-5.

3. A polishing composition as set forth in claim 2, wherein the polishing agent is contained in an amount of 2-30% by weight of the total composition, and has a mean particle size of 0.7-4 μm and a maximum particle size of 20 μm or less.

4. A polishing composition as set forth in claim 3, wherein the polishing agent is α-aluminium oxide prepared by calcining granular boehmite at a temperature of 1,100°-1,200° C. for 2 to 3 hours, crushing relatively larger particles into finer particles and separating particles falling within a predetermined particle size distribution.

5. In a polishing process with a polishing composition applied between a surface of a product and a surface of a polishing pad which is slidable on the surface of the product, the improvement wherein the polishing composition comprises water, a polishing agent of aluminum oxide and a polishing accelerator of nickel sulfate, and said polishing composition is neutral or weak acid in pH measurement.

6. A polishing process as set forth in claim 5, wherein the product is a plastic product.

7. A polishing process as set forth in claim 5, wherein the surface of the product is a layer of non-electrolysis nickel plating.

8. A polishing process as set forth in claim 5, wherein the surface of the product is an alumite layer.

9. A polishing process as set forth in claim 5, wherein the product is an aluminium product.

* * * * *